United States Patent Office 3,454,948
Patented July 8, 1969

3,454,948
TACAN DIGITAL BEARING INDICATOR SYSTEM
Frederick G. Reinagel, Tonawanda, N.Y., assignor to Sierra Research Corporation, a corporation of New York
Filed Dec. 1, 1967, Ser. No. 687,237
Int. Cl. G01s *1/44;* H03d *13/00;* G01r *25/00*
U.S. Cl. 343—106                                    11 Claims

ABSTRACT OF THE DISCLOSURE

A system for use aboard an aircraft or other vehicle for determining from received TACAN signals the bearing of the vehicle to the beacon signal source, and displaying this bearing in degrees. The system employs two counter chains, namely a reference counter chain which continuously counts out the degrees of rotation of the beacon's rotating pattern, synchronously therewith, and a storage counter chain which is similar to the reference counter chain but does not continuously count. Instead, the storage counter chain registers the bearing in degrees from the aircraft to the beacon and controls the display of this bearing. During the rotation of the TACAN beacon pattern, the count of the reference counter which is synchronized thereto becomes coincident with the count held and displayed by the storage counter chain, and the occurrence of this coincidence will be either early or late with respect to the moment when the beacon pattern sweeps across the local aircraft. If early, an increment is added to the storage counter chain to count it up; if late, an increment is subtracted from its count to count it down. The cumulative fine-adjustment effect of these increments makes the reading of the storage counter chain continuously approach the correct bearing reading. The system also includes a digital smoothing feature to prevent jitter of the output display reading, and further includes coarse reset means for respectively causing both counter chains to start at readings approximating the counts which they should contain, shortly after initial turn-on when these readings are random.

Figure 1A:
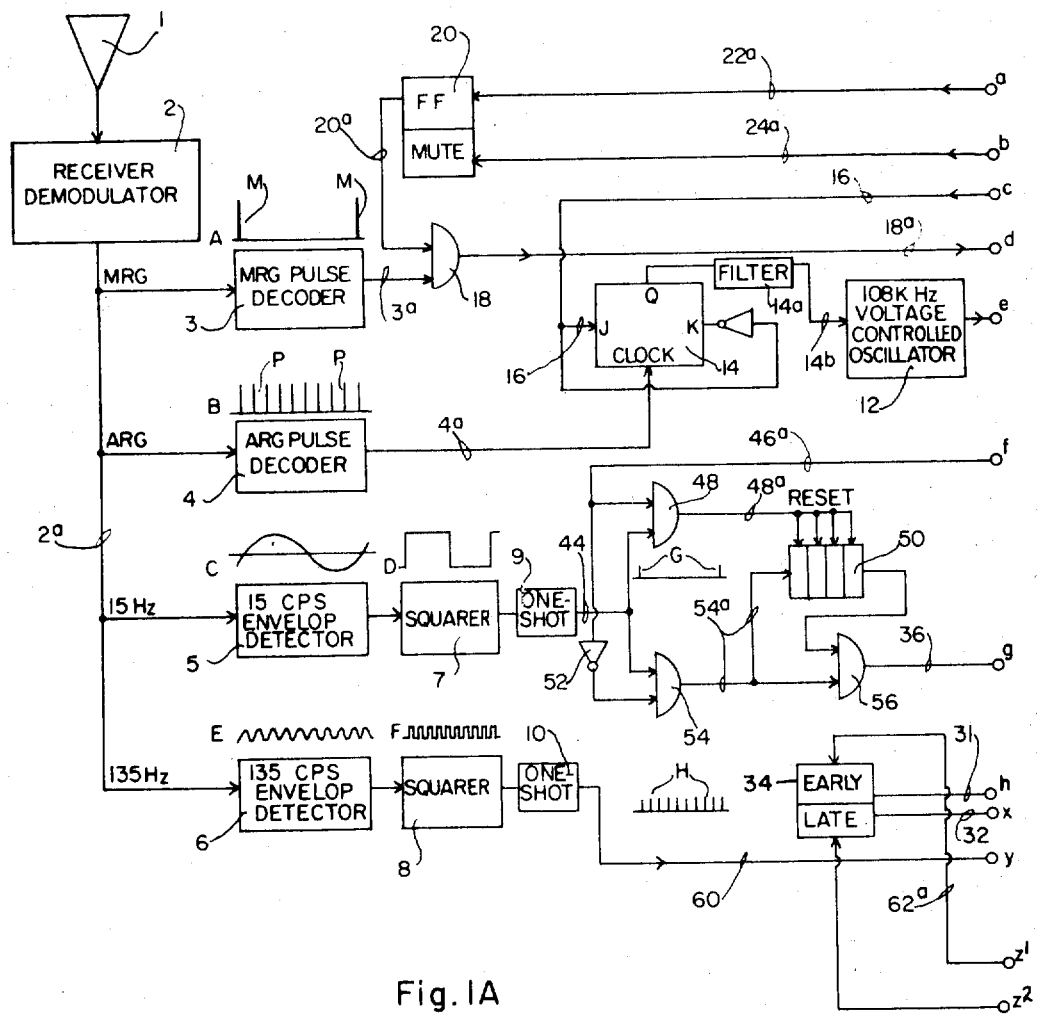

This invention relates to improvements in mobile TACAN systems for receiving and using TACAN bearing signals, and more particularly relates to an improved system for employing these received signals to determine and display the bearing in degrees from the mobile system to the ground beacon.

The TACAN system to which this invention relates is well known, and extensively described in the prior art. It includes a ground (or marine) beacon which delivers a predetermined pulse pattern having a sinusoidal envelope rotating at 15 revolutions per second and including a coded pulse group known as the MRG (Main reference group) which is radiated omnidirectionally as a North marker when the zero-axis crossing of the positively increasing sinusoidal envelope is oriented North, the pattern being formed by squitter pulses whose amplitude varies around the pattern according to one complete 15 Hz. sinusoid. In addition the amplitudes of these pulses are modulated through nine auxiliary sinusoidal variations superimposed upon the main sinusoid, thereby creating a modulation of the main 15 Hz. sinusoidal pattern at a rate of 9×15=135 Hz. The present invention includes means for detecting the North zero-axis crossing of each 135 Hz. modulation cycle to provide pulse markers occurring at a 135 Hz. rate, and these pulse markers will be referred to as the ARG (Auxiliary reference group). When the receiver in a mobile unit receives and detects the rotating TACAN pattern, it then has four characteristic signals from which to determine bearing: namely the main 15 Hz. sinusoidal pulse envelope; the MRG pulses representing the North orientation of the initial zero-axis crossing of each 15 Hz. envelope; the auxiliary 135 Hz. sinusoidal envelope; and the ARG pulses representing the North orientations of the beginnings of each of the nine 135 Hz. sinusoidal envelopes.

It is a major object of this invention to provide a TACAN bearing determining and read-out system which operates using digital principles to provide precision performance, as distinguished from circuits requiring sensitive calibration adjustments to attain the required degree of accuracy.

Another object of this invention is to provide a digital bearing displayed directly in degrees, but within fine increments of correction are introduced into the reading in terms of small fractions of a degree which fractions are not displayed, whereby to provide a sort of digital filtering or smoothing effect which prevents upsetting of the readings by occasional spurious increments which would otherwise tend to introduce jitter into the read-out.

A further object of the invention is to provide a digital system which shapes the demodulated squitter envelopes into square waves, generates pulses marking the zero-axis crossings of the envelopes, and then uses these pulses to operate the digital counters of the system.

Still another object of the invention is to provide a digital system having means for initially making a coarse reset of the counters to values approaching the correct readings, and then frequently making fine increments of correction to up-date the accuracy of the counters' readings.

A further object of the invention is to provide a digital system which lends itself readily to modern solid-state circuitry techniques and can be made using commercially-available integrated modules.

Figure 1B:
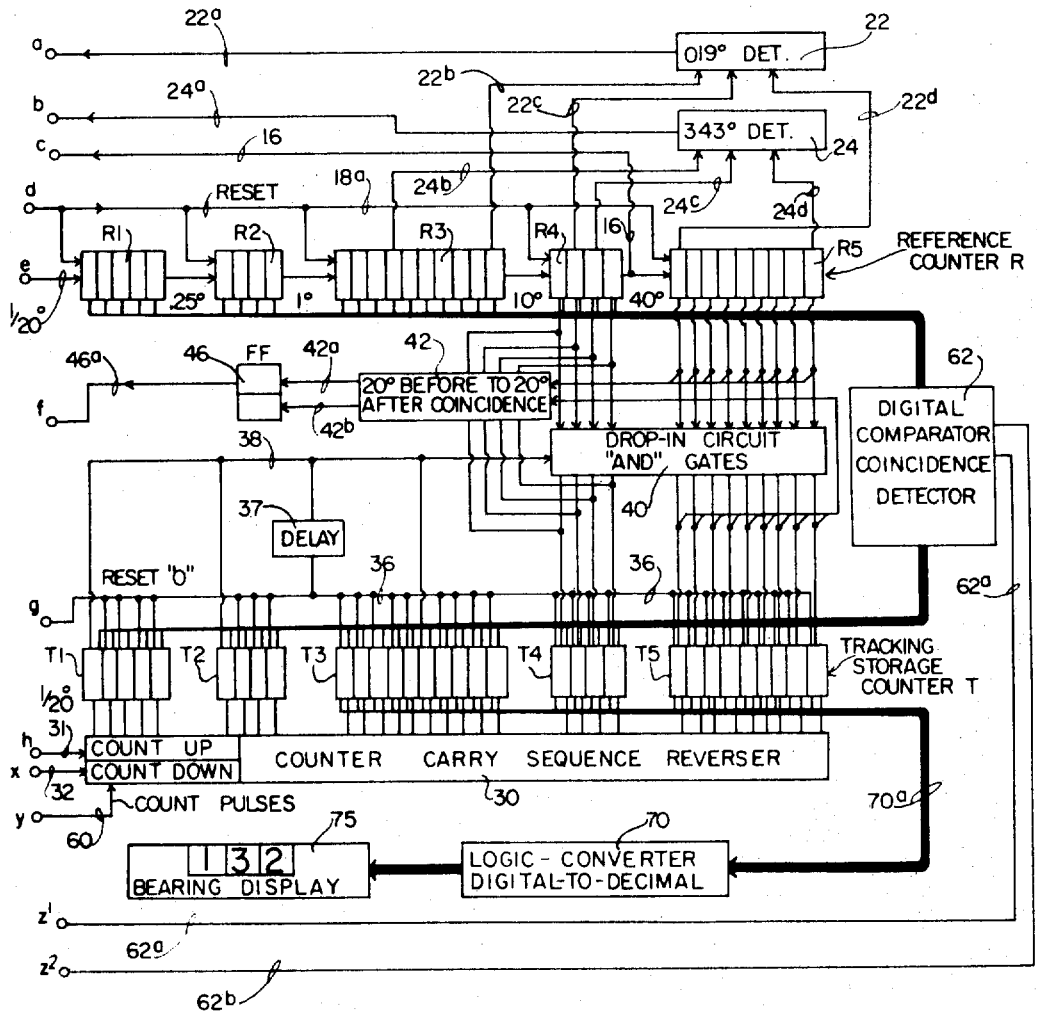

Other objects and advantages of the invention will become apparent during the following discussion of the drawings, wherein:

FIGS. 1A and 1B together comprise the block diagram of a mobile unit including the present bearing read-out system.

The composite block diagram of FIG. 1 represents a practical embodiment of a TACAN Bearing Indicating System according to the present invention, the system being suitable for installation in a mobile unit, such as an aircraft, for receiving the radiation pattern transmitted by a remotely located TACAN beacon (not shown). The pattern transmitted by the TACAN beacon comprises pulses radiated in identifiable pulse groups, i.e., pairs of pulses having characteristic widths and spacings. These characteristics identify TACAN pulses and prevent confusion thereof with spurious pulses of ungrouped character. These pulses are received by each mobile unit at the antenna 1 and enter a receiver 2 wherein they are demodulated and delivered via the wire 2a to four decoders and detectors 3, 4, 5, and 6. The decoders 3 and 4 are provided with suitable recognition circuitry (not shown) for accepting TACAN pulses having the above-mentioned characteristics and eliminating spurious pulses.

The output of the first decoder 3 is a single pulse M which represents the time when the main 15 Hz. modulation envelope of the beacon pattern sweeps across North, namely, when the envelope, while rising in the positive direction, crosses the zero axis as the beacon rotates. At this time, as is well known in the prior art, the beacon delivers its main reference group MRG which is a coded group of pulses. The decoder 3 identifies these MRG pulses and delivers the pulse M to mark the beginning of a new cycle of the 15 Hz. sine wave envelopes of the beacon.

These are nine auxiliary sine wave modulation cycles superimposed around the main 15 Hz. pattern, and the decoder 4 decodes a pulse P marking the North zero-axis crossover at the beginning of each of these nine cycles which occur at the rate of 135 cycles per second. The waveform B shows these pulses P, each of which represents the occurrence of an auxiliary reference group ARG. The pulses P were also decoded from grouped pairs, but a single output pulse P is delivered to represent each group.

The detector 5 recovers the sinusoidal envelope of the 15 cycle modulation as viewed from the present aircraft, the envelope being shown in the waveform C, and delivers this sinusoid to a squarer circuit 7 which provides a square wave D having sharply defined zero-axis crossovers.

Likewise, the detector 6 recovers the envelope of the 135 cycle sine wave modulation as viewed from the present aircraft, and delivers this envelope to a squarer circuit 8 which forms and delivers a square wave F in which the zero-axis crossings are sharply defined.

In view of the fact that the square waves D and F both include not only the zero-axis crossovers in the positive direction but also the zero-axis crossovers in the negative direction, "one-shot" multivibrators 9 and 10 are inserted in the output of the squarer circuits 7 and 8, respectively, to generate very narrow output pulses representing only the positive axis-crossings.

Thus, included in the outputs of the circuits 3, 4, 9 and 10, there are four available information features gained from detecting the radiation pattern of the beacon. This information includes the demodulated pulses M as shown in waveform A and occurring once during each rotation of the beacon to represent the transmission of the main reference group indicating North orientation of the pattern at the beginning of a new 15 cycle modulation envelope; the demodulated auxiliary reference group pulses P as shown in the waveform B and representing North orientation of the beginning of each of the 135 cycle modulation sinusoids; the zero axis crossing pulses shown in the waveform G and representing the moment as viewed from the mobile unit when the beacon pattern's 15 cycle modulation envelope passes through zero-axis in the positive direction; and pulses shown in waveform H representing the zero-axis crossings of each auxiliary 135 Hz. modulation cycle as it sweeps across the position occupied by the present mobile unit. Consequently, the waveforms A and B represent the moments when the beacon patterns point North, and the waveforms D and F represent the moments when the beacon patterns point at the local aircraft, and these respective moments are used to determine the bearing of the aircraft with respect to the beacon.

The block diagram, particularly FIG. 1B includes two counter chains employing flipflops to count out bearing angles in a digital manner. The upper counter chain will be referred to hereinafter as the reference counter R, and the lower counter chain will be referred to hereinafter as the tracking storage conuter T. Each of these counter includes five counting rings which count according to a digital format, which is however in the case of most of the rings not decimal. These reference counters have the effect of dividing input pulses thereto by a factor of 5:1 in the first ring, 4:1 in the second ring, 10:1 in the third ring, 4:1 in the fourth ring, and 9:1 in the fifth ring. The reference counter R, including the five counter rings R1, R2, R3, R4, and R5, includes at any particular time a digital representation of the momentary rotational position of the TACAN beacon pattern. In other words, it is continuously counted from 0 to 360 degrees in synchronism with the rotation of the modulation pattern of the beacon. The tracking storage counter T, including the counting rings, T1, T2, T3, T4, and T5, is similar to the reference counter R in that it includes five counting rings each having the same number of flipflops which also contain a digital representation of a bearing, but this representation does not track the rotation of the ground beacon. Rather, it represents at any particular moment the bearing from the aircraft to the TACAN beacon, which changes only with movement of the aircraft with respect thereto.

Returning now to the reference counter R, which is always counted upwardly in step with the rotation of the TACAN beacon pattern, this counter expresses the angular position of the beacon's pattern in space as a function of time. In order to maintain synchronous accuracy, the reference counter R must have its count increased by increments at regular intervals, and according to the present illustrative embodiment each increment amounts to $\frac{1}{20}°$. Recalling that the rotation rate of the TACAN antenna pattern is 15 revolutions per second, the counting rate for entering these increments into the reference conuter R is 108,000 counts per second (360 x 20 x 15).

The 108 kHz. counting rate is established and maintained by an oscillator 12 which delivers an output pulse to the terminal e which is also the input terminal to the first counter ring R1. The oscillator 12 is of the type whose frequency can be controlled by the input level of a control voltage on wire 14b. This wire comes from a filter 14a which is driven by a J-K flipflop circuit 14 whose output from the Q terminal is either a binary "1" or a binary "0" depending on the condition of the flipflop 14. The filter 14a shapes the output of flipflop 14 such that a binary "1" raises the control voltage within the oscillator 12 by a small increment causing the oscillation rate to increase whereas a binary "0" lowers the control voltage within the oscillator 12 thereby causing its freqency to decrease. The circuit averages out a satisfactory oscillator frequency when the output of the circuit 14 flipflops frequency back and forth between its "0" and "1" outputs, under the control of synchronizing circuitry which will be presently described in detail.

Returning for the moment to the circuitry of the reference counter R and the tracking counter T, the basic structure of both counters is the same. Each counter consists of five rings each of which in the working embodiment of the present invention is a shift ring counter made up of J-K flipflops which shift a binary "1" to the next flipflop in the ring with each count. Within each counting ring, for instance R1, only one of the flipflops contains a binary "1" and the other flipflops all contain a binary "0." It is that binary "1" which is shifter to the next flipflop each time a clock pulse is received, such clock pulses coming from the voltage control oscillator 12 in the case of the first counter ring R1, whose output then becomes the clock pulse for the flipflops in the ring R2, whose output becomes the clock pulse for the counter ring R3, and so on. Each ring therefore has a counting capacity equal to its total number of flipflop stages. The rings R1 and T1 have a capacity of five counts, the rings R2, T2, R4, and T4 all have capacities of four counts; the rings R3 and T3 have the capacity of 10 counts, and the rings R5 and T5 have the capacity of nine counts. Thus, the 108,000 pulses persecond from the voltage controlled oscillator 12 are divided by a factor of 5 by the ring R1, and since these input pulses occur every $\frac{1}{20}°$ of rotation of the TACAN antenna pattern, an output pulse from the ring R1 occurs every $\frac{1}{4}°$ of pattern rotation. The ring R2 divides by a factor of 4, and therefore each of its output pulses represents 1° of pattern rotation. The ring R3, having 10 stages delivers an output pulse every 10° of rotation of the TACAN beacon pattern. The ring R4 divides by a factor of 4, and therefore it has an output pulse once per every 40° of beacon rotation. Finally, the ring 5 divides by a factor of 9:1, and therefore its count is completed once every 360° of rotation of the beacon antenna pattern. It is to be further noted that since there are nine 135 Hz. minor modulation sinusoids for each complete rotation of the 15 Hz. beacon pattern, an output from the ring R4 should occur on the wire 16 at the beginning of each of the minor modulation envelopes. This fact is used to determine whether the reference counter R is precisely synchronized with the rotation of the TACAN bacon pattern, and this determination is made nine times during each complete revolution of the beacon pattern.

Assuming for the moment that the reference counter R is fairly closely synchronized with the actual rotation of the beacon antenna, although not perfectly synchronized, the frequency of the voltage controlled oscillator 12 must be dragged in such a direction as to decrease the remaining error. As pointed out above, the auxiliary reference pluse group ARG occurs each time the minor modulation sinusoid rises and crosses the zero axis in the North direction of the antenna pattern. The pulses P represent these North crossings, as shown in the wareform B located above the decoder box 4 in the FIG. 1A. On the other hand, if the reference counter R were in perfect synchronism with the rotation of the TACAN beacon pattern, a zero count occuring every 40° would appear at the output of the counter ring R4 on the wire 16 and would coincide with the occurrence of a pulse P on the wire 4a. Therefore the direction of an existing synchronization error can be determined by comparing the times of arrival of the pulse on wires 4a and 16. The J–K flipflop 14 is connected to these wires in such a manner that if the zero count pulse on the wire 16 precedes the pulse P on the wire 4a, a binary "0" will appear at the output Q, thereby tending to lower the frequency of the oscillator 12 and slow the count of the reference counter R to cause its next output on wire 16 to occur somewhat later. Conversely, if the output pulse P on the wire 4a is earlier, then a binary "1" will occur at output terminal Q and will tend to raise the frequency of the voltage control oscillator 12, thereby causing its next output on the wire 16 to occur earlier and more nearly in step with the actual rotation of the antenna.

The above-explained fine synchronization of the reference counter R assumes that it is already nearly synchronized, and that only minor corrections are necessary. However, if initial synchronization is random, the above steps might cause the counter R to synchronize to a wrong ARG pulse from the decoder 4, since there are nine of these pulses per rotation of the antenna pattern. Thus, it is necessary to perform coarse synchronization whenever there is doubt as to which of the ARG pluses is being synchronized to. Coarse synchronization is accomplished using the output of the MRG pulse decoder 3 providing an M pulse just once per complete revolution of the TACAN antenna pattern. Coarse synchronization is accomplished as follows:

If the error in the count of the reference counter R is rather large with the result that the main reference group pulse M, representing the North heading of the 15 Hz. antenna pattern, actually takes place at a time later than 019° but earlier than 343° of the count in the reference counter R, the main reference pulse M will pass through the And-gate 18 and will be delivered on wire 18a through terminals d to reset the reference counter R to a zero count. Recalling that the actual moment of occurrence of the MRG pulse M represents the 0° position in space of the TACAN antenna pattern, such resetting to zero will make its reading substantially correspond with the actual position of the antenna, plus or minus small system delays which will represent only a few degrees of error. One such reset after initial turn-on should be sufficient, and attainment of accurate synchronization should then be had by employing the fine adjustment steps set forth above for dragging the frequency of the voltage controlled oscillator 12 to make the zero output counts of the reference counter R4 appearing on wire 16 coincide with the auxiliary reference group pulses P appearing on wire 4a. Hence it would not be desirable to permit each output on wire 3a to reset the reference counter R every time the MRG pulses M arrives at gate 18. Therefore, a bistable flipflop 20 is provided for the purpose of muting the coarse reset output through gate 18 unless the pluse M occurs after the 019° count of the reference counter R, but before the 343° count thereof. In other words, the fine quasi analog adjustment of the frequency of the oscillator 12 is permitted to make all further adjustments in the counting rate of the reference counter R so long as the main reference group pulse M occurs reasonably close to zero count of the reference counter R, namely between 343° and 019°. Hence, it is desirable for the gate 18 to be blocked by the muting flipflop 20 beginning at a 343° reading of the reference counter R and until the reference counter R reaches a count representing 019°, and then remain unblocked until the next reading representing 343°.

For this purpose, the output of flipflop 20 is set to a logical "1" by the occurrence of an output on the wire 22a through the terminals a to provide a voltage on the wire 20a for enabling the And-gate 18, but is reset to "0" to mute the enabling output on wire 20a by the next output from the 343° detector 24 on wire 24a through the terminals b. The 019° detector comprises an And-gate having three inputs on wires 22b, 22c, and 22d from appropriate J–K flipflops within the reference counter R whose outputs simultaneously correspond with a bearing count of 019°. Likewise, the 343° detector comprises an And-gate having three inputs on wires 24b, 24c and 24d representing the conditions of the three ring counters R3, R4, and R5 corresponding with a bearing count of 343°. In this way, the coarse reset is muted from a count just preceding 0° of pattern rotation to a count just following 0° pattern rotation, but is unmuted to permit coarse reset of the reference counter R if the main reference group pulse M occurs outside of the brief muted interval of 343° to 019°.

Having just described the reference counter R which is phased-locked to the rotation to the TACAN ground beacon pattern, the description now turns to the tracking storage counter T which is intended to always contain a digital number corresponding to the bearing angle as measured from the mobile unit to the ground beacon. The basic configuration of the tracking storage counter T is substantially the same as the reference counter R with regard to the number of counting rings and the number of J–K flipflops included in each ring, whereby the output increments of each ring represent the same angular bearing displacement per cycle. The big difference between the tracking storage counter T and the reference counter R resides in the fact that the storage counter T must be fully reversible so that it can be counted either up or down by any particular input pulse. No reversal of the reference counter R is necessary because it follows the rotation of the ground beacon pattern which is always in the same direction. Instead, the tracking storage counter T must follow the angular progress of the aircraft around the beacon, and therefore it must be able to count in either direction. Moreover, these increments represent corrections which may take place in either direction, depending upon whether the tracking storage counter is momentarily reading too high or too low at the instant when its reading coincides with the reading of the reference counter R, to be hereinafter discussed.

For the purpose of reversing the counting direction of the storage counter T, the outputs of the various flipflops and of the various counter rings T1, T2, T3, T4, and T5 are brought out to a "Carry Sequence Reverser" 30, this reverser operating in the manner of a two-position switch, which in one position of the switch connects the flipflops and rings to count and carry in one direction, and in the opposite position of the switch connects the flipflops and rings to count and "carry" in the reverse direction. Although this reversal can be accomplished by a mechanical switch, in the actual working embodiment of the present invention the carry sequence reverser 30 contains a plurality of "And" gates and "Or" gates which are respectively enabled to select the desired counting direction depending upon which of the inputs 31 and 32 to the reverser 30 is energized. These inputs are taken respectively from an "Early/Late" flipflop 34 whose outputs 31 and 32 are mutually exclusive and serve to control the reverser 30 and select the necessary count up, or count down, function, to be described more fully below.

As described above in connection with the reference counter ring R, the various flipflops comprising the rings of both counters are J–K flipflops whose outputs can be either binary "0" or a binary "1," and the counter rings are set up so that only one of the flipflops in each of the rings contains a binary "1" at any particular time. All of the other flipflops in the same ring contain a binary "0." The binary "1" in each ring is shifted either in the forward direction or in the reverse direction from one flipflop to an adjacent flipflop each time an input is provided to the ring, the direction of shift being determined by the carry sequence reverser 30. When the system is first turned on, and both counters contain random readings, the reference counter R will, over a short period of time, become synchronized with the rotation of the ground beacon pattern by the coarse and fine steps set forth above. The tracking storage counter T must then reset and approach the reading in the reference counter R at the instant when the beacon pattern sweeps across the local aircraft. Although it was possible to reset the reference counter R to zero at the approximate moment when the beacon pattern was oriented Northward, the presetting of the tracking storage counter T is more complicated because it must be reset to read approximately the same as the reference counter R, whatever the latter may read at the moment of reset of the tracking storage counter T.

It is not necessary to coarse preset the tracking storage counter T exactly to the momentary reading of the reference counter R, because the former will approach the reading of the latter as time goes by as a result of the rapid input of fine increments of correction as will be hereinafter discussed. The process of transferring a digital count from the reference ring counter R into the tracking storage counter T for the purpose of presetting the latter to approximately match the former is referred to hereinafter as "drop-in." In order to simplify the circuitry required to accomplish drop-in, only the last two rings T4 and T5 will be corrected to match the reading of the corresponding rings of reference counter R, and the first three rings T1, T2, and T3 will be preset to a fixed count, that is, the rings T1, T2, and T3 will always be preset to read a total count of five degrees, whereas the rings T4 and T5 will be corrected by "drop-in" to match the momentary readings or the rings R4 and R5. Such preset is initiated by a signal appearing on the wire 36 and taken from the terminal g, the initiating signal being derived in a manner to be described hereinafter.

Because of the fact that it would be meaningless for a ring to include two flipflops simultaneously having a binary "1," it is desirable to reset all the various flipflops to contain zeros before dropping a "1" into any ring. In this way, it will be certain that only one flipflop in each ring will contain a binary "1" after the preset step is concluded. The preset to "0" of all of the flipflops is accomplished by the voltage appearing on wire 36. The voltage exists for a brief interval and the terminates, but during its existence it initiates a delayed signal through a delay circuit 37 onto the wire 38. Thus, immediately following the zero-reset on the wire 36 a pulse appears on wire 38, and this pulse establishes a binary "1" in the first flipflop of the counter ring T1; a binary "1" in the first flipflop of the counter ring T2, and a binary "1" in the sixth flipflop of the counter ring T3, these inputs corresponding with a reading of 5° in the first three counter rings. The pulse appearing on wire 38 also actuates the "drop-in" circuit 40 which comprises a series of "And" gates connecting the various outputs of the flipflops in the rings R4 and R5, respectively, to the corresponding flipflops in rings T4 and T5, it being noted that all ol the outputs from the ring R4 and the ring R5 comprise binary "O's" except for the single flipflop in each ring which contains a binary "1." Since the flipflops in the tracking storage counter rings T4 and T5 have previously been reset to 0, the actuation of the drop-in gates 40 by the pulse 38 actually transfers only one binary "1" from each of the rings R4 and R5 to one of the flipflops in each of the rings T4 and T5. Therefore, the appearance of the pulse on wire 38 has preset the tracking storage counter T to read the same as the reference counter R in the 10s and 100s digit, and to read 5° in the units digit. Thus, the maximum error after coarse reset by the "drop-in" method is only about plus or minus 5°, which error will be removed in a short time by the input of "fine" corrective pulses to the tracking storage counter T in the manner to be presently explained.

Referring now to the circiut which initiates the reset and "drop-in" function on wire 36, this circuit will be especially useful after initial turn-on of the equipment. On the other hand, it must be automatically muted whenever the accuracy of the reading in the tracking storage counter T is within the capability of the "fine" incremental inputs to properly correct. Moreover, the control should automatically become operative again if for some reason the reading in the tracking storage counter T becomes erroneous, for instance as might happen as a result of momentary loss of power in the unit. In order to prevent coarse correction of the tracking storage counter T as a result of an isolated transient condition, the control system is provided with an error counter 50 which requires that a certain number of erroneous indications must occur in succession before the coarse correction of the system is initiated. As long as the error in the reading of the tracking storage counter T is less than plus or minus 20°, it can be assumed that the tracking storage counter T is being actuated by the correct output cycle from the 135 c.p.s. envelope detector 6 and squarer 8. Since there are nine cycles of the auxiliary wave form E during each completion rotation of the main envelope C, nine zero axis crossings in the positive direction will occur and will generate pulses in "one-shot" multivibrator 10 to count the tracking storage counter T either up or down depending on the condition of the sequence reverser 30. These pulses occur every 40 degrees of rotation of the ground beacon pattern, and it is therefore desirable that the tracking storage counter T never contain an error consistently exceeding ±20° without initiating a coarse reset function to bring it approximately into synchronism with the reference counter R at the moment when the main pattern of the ground beacon is directed at the mobile unit. The determination as to whether or not to perform coarse reset is made by the ±20° error detector 42 which determines two 20° positions, one occurring 20° before coincidence of the two counters R and T and the other occurring 20° after coincidence of the counters.

Basically, the moment of interest in determining whether or not the storage counter T is adequately synchronized for coarse purposes occurs at the moment when the 15 cycle envelope of the rotating ground pattern sweeps across the local unit, i.e., its pattern crosses the zero-axis in the positive-going direction. If at this moment the count in the tracking storage counter T is within 20° of the count in the reference counter R, then the tracking storage counter T is within the capability of the "fine" increments to fully correct its reading. However, if there is more than a plus or minus 20° difference between the counters at the moment of positive output of the "one-shot" multivibrator 9 onto the wire 44, the coarse preset of the tracking storage counter T may be desirable and necessary. Thus, the 20° detector circuit comprises in effect a series of And and Or gates 42 determining a first moment when the difference between the reading of the counter R is within 20° of the reading of the counter T as the former approaches the latter. This reading comprises an output on the wire 42a which sets a flipflop 46 to provide a muting output on the wire 46a, and this output remains on the wire 46a as a muting signal until the detector 42 detects a condition corresponding with 20° difference between the counters R and T in which the reading in the counter R is 20° greater than the reading in the counter T. At this point, an output appears on the wire 42b and resets the flipflop 46 to remove the muting voltage from the wire 46a. The presence of a muting voltage on the wire 46a has the effect of disabling the coarse reset circuitry so that if the output on wire 44 occurs while the muting voltage is present and the beacon pattern is pointing generally at the aircraft, no coarse reset will occur. Conversely, if the TACAN pattern sweeps across the position of the mobile unit and provides a signal on the wire 44 at a moment when there is more than 20° difference in the count between the counters R and T, then coarse reset action will be initiated as follows:

During the interval when the counter T is within 20° of the counter R, the signal on wire 46a will enable the gate 48, and if during the ±20° muting interval of the ground beacon pattern sweeps across the aircraft so that an output appears on wire 44, this output will be passing through gate 48 and the wire 48a to reset a four stage counter 50 to zero. This counter counts the number of errors, namely the number of times in succession that the beacon pattern sweeps across the location of the aircraft and the tracking storage counter T is not within 20° of the reference counter R. Each time the beacon pattern sweeps across the aircraft when the error is greater than 20°, the error counter 50 is counted upwardly one count. Therefore, it takes nine consecutive errors to cause the tracking counter T to be "coarse" present to match the reference counter R. If in the meanwhile the pattern sweeps across the aircraft when the difference between counters is less than 20°, then an output through the gate 48 on wire 48a will reset the error counter 50 to zero. The output of the muting flipflop 46 on the wire 46a is also delivered through an inverting amplifier 52 to the "And" gate 54. Thus, the "And" gate 54 is blocked when the "And" gate 48 is conductive and vice versa. Since the zero crossing of the 15 cycle main modulation envelope of the beacon provides a signal on the wire 44 when the beacon sweeps across the present aircraft, the signal from wire 44 will always pass either through the gate 48 or the gate 54. If the storage counter T is within 20° of the correct reading of the reference counter R when the signal appears on wire 44, the signal will pass through the gate 48 and reset the counter 50 to zero. If the reading in the reference counter R is more than 20° different from that in the counter T when the said zero crossing of the beacon pattern provides an output on the wire 44, the gate 48 will be blocked, and the gate 54 will be conductive, and an output will appear on wire 54a and advance the counter 50 by one count. When the ninth count of the counter 50 has been thus actuated, meaning that nine errors have occurred in a row, the gate 56 will become conductive and thereby energize the wire 36 causing reset of the storage counter flipflops to zero, followed by drop-in of the count from the reference counter R into the storage counter T.

Once a valid drop-in has occurred so that the tracking storage counter T reads a value which is within about ±5° of the momentary reading of the reference counter R at the instant when the beacon pattern sweeps across the present aircraft, no further coarse reset should be necessary and all further correction to the tracking storage counter T should be accomplished by either counting it up or counting it down using pulses appearing on the wire 60 at the rate of nine pulses per revolution of the beacon pattern, which is also equivalent to one counting cycle of the reference counter R. Because of the dividing ratios of the various rings T1, T2, T3, T4, and T5 as discussed above, each input pulse on the wire 60, which is transferred through the carry sequence reverser 30 to the input of the counter T1, represents 1/20°. There are nine of these steps per revolution of the ground beacon pattern. The direction in which each 1/20° increment should step the storage counter T is governed by a determination of whether the beacon pattern sweeps over the local aircraft before or after the reference counter R becomes coincident with the count in the storage counter T. If the pattern sweeps over the local aircraft before such coincidence, the tracking storage counter T contains too high a count and should be reversed to count down; whereas, if the pattern sweeps over the local unit after coincidence, the number contained in the storage counter T is too low and therefore is caused to count up. A state of equilibrium is reached when on an average basis half of the increments count the counter T up, and the other half count the counter down, whereby the bearing angle indicated by the present system is determined when such an equilibrium is achieved. It is undesirable to have the last digit in the decimal read-out dither back and forth between two adjacent values, as might happen if the system were overly sensitive to the input increments. This type of jittering is minimized by inserting only very small increments, in this case 1/20° increments, into the first stage of the counter T, and then displaying only the count in the last three stages of the counter T. In this way, a sort of digital filtering occurs which causes a smoothing effect on the read-out of the system, Referring again ot the bi-directional counting of the storage counter T, in order to insure rapid correction of bearing angle readings the counter is incremented nine times per revolution of the antenna pattern by the nine zero-axis crossings of the 135 Hz. signal represented by pulses from the "one-shot" multivibrator 10, and the seqence reverser selects in the case of each increment whether it shall be used to count the counter T up, or down. The coincidence detector 62 is connected only to the first four stages of both counters R and T, the rings R5 and T5 not being connected to the coincidence detector. Therefore, the first four rings of the two counters will come into coincidence nine times per revolution of the TACAN antenna pattern, every 40°. Each time, a determination has to be made as to whether coincidence occurs early or late with respect to the 135 Hz. zero-axis crossing as indicated by the output of "one-shot" multivibrator 10 via the wire 60. The digital comparator 62 comprises a series of logic gates arranged to detect coincidence and deliver an output on wire 62a. The digital comparator 62 also includes other logic for determining the point of anti-coincidence, and accordingly delivering an output on wire 62b. Thus, as the antenna pattern rotates and the first four stages of the reference counter R go into and out of coincidence with the count in the corresponding four stages of the tracking storage counter T, an output will appear every 40° on wire 62a at the moment of each coincidence, and another output will appear on the wire 62b at the anti-coincidence moment, located half-way between adjacent moments of coincidence. These two outputs are connected to the bi-stable flipflop 34 such that every time an output appears on the coincidence wire 62a, the flipflop 34 produces a binary "1" on wire 31 actuating the sequence reverser 30 to interconnect the units of the tracking storage counter T to count upwardly. Twenty degrees later in the rotation of the TACAN pattern, an output appears on the wire 62b and reverses the flipflop 34 to deliver a binary "1" output on wire 32, thus altering the sequence reverser 30 to reconnect the units of the counter T to count downwardly.

At the time when the TACAN pattern points squarely at the present aircraft, both the 15 Hz. modulation and the 135 Hz. modulation are just crossing the zero axis in the increasing direction. If both counters R and T are at the precisely correct count, coincidence will result at this moment. If the storage counter T contains too low a count, coincidence will occur early, meaning that a coincidence output will appear on wire 62a before the pulse occurs on wire 60, and therefore the coincidence output on wire 62a will enable the count-up terminal 31 chronologically before the pulse on wire 60 is delivered to the tracking counter T. In this way the count will be increased in the tracking storage counter T, thereby making the succeeding coincidence occur later.

Conversely, if the count in the storage counter T is too high, coincidence will not yet have occurred when the zero axis crossing pulse appears on the wire 60, and therefore the flipflop 34 will still be in the "late" position as enabled by the preceding anti-coincidence signal on wire 62b. Therefore, the pulse 60 will be used to count the storage counter T downdardly, tending to make coincidence occur earlier at the time of the next zero-axis crossing which delivers a pulse on the wire 60. In this way, nine early/late determinations are made per revolution of the TACAN antenna pattern, and nine corrections of 1/20° each are made during each revolution of the pattern, these corrections occurring at the rate of 135 times per second. The system is in balance when the sequence reverser is reversed every few pulses, so that the average reading thereof is centered about the correct bearing count.

Since the present system is intended to display bearing angles in degrees only to three integer digits, the first several stages of the storage counter T are not displayed, but rather only the counts contained in the last three rings T3, T4, and T5 are displayed. However, these counts are digital, not decimal. A converter 70 is therefore added to the system and connected by a cable 70a to receive the various outputs of the counting ring T3, T4, and T5, this converter containing logic suitable for converting from the digital format in the counter rings to a decimal format, using ordinary gates to accomplish this conversion in a manner well-known per se. The output of the logic converter 70 is then delivered to a display device, for example employing suitable drivers and nixie tubes, which read directly in degrees from 0 to 359, representing the bearing from the aircraft to the beacon. By changing the connections of the converter 70 to the storage counter T, the read-out can easily be made to read bearing from the beacon to the aircraft, or whatever other mobile unit the present system is installed in.

The present invention is not to be limited to the exact form shown in the drawings, for obviously changes may be made therein within the scope of the following claims.

I claim:

1. A system for determining and displaying the relative bearing between a mobile receiving unit and a beacon which transmits a continuously rotating pattern having a characteristic directional envelope and further transmits reference pulses when the pattern points in a predetermined azimuth direction, and the mobile unit receiving said pulses and pattern and having means for delivering an indicative signal when the pattern points at the unit, the system comprising:
   (a) reference ring counter means for continuously accumulating a count representing the angular rotation of said pattern;
   (b) means for synchronizing the count of the reference ring counter means with the receipt of said reference pulses;
   (c) storage counter means for containing an angular count representing said relative bearing angle;
   (d) means for detecting coincidence between the counts in said counter means; and
   (e) means responsive to said indicative signal for correcting the count of the storage counter means toward coincidence with the count in the reference ring counter when the pattern points at the unit.

2. In a system as set forth in claim 1, said means for synchronizing the reference ring counter means comprising, coarse synchronizing means including means responsive to receipt of said reference pulses for resetting the reference counter means to a count representing a predetermined azimuth direction; and means for muting said resetting means during each count for an interval beginning just before said predetermined azimuth count and ending just after it.

3. In a system as set forth in claim 1, said means for synchronizing the reference ring counter means comprising, fine synchronizing means including oscillator means connected to advance the count of the reference ring counter means and having means to adjust its oscillation rate; means for obtaining outputs from the reference ring counter means upon the occurrence of counts which should correspond with said predetermined azimuth directions; and means responsive to the chronological occurrences of said outputs and said reference pulses and operative to actuate said rate-adjust means to increase the oscillation rate when the reference pulses occur before said outputs, and to decrease the oscillation rate when the reference pulses follow said outputs.

4. In a system as set forth in claim 1, wherein said characteristic envelope pattern includes a lower frequency modulation and a higher frequency modulation having multiple cycles integrally fitting within one cycle of the lower frequency modulation, and said reference pulses include a main reference group of pulses representing the orientation of commencements of both modulations in predetermined azimuth direction and further include multiple auxiliary reference pulse groups representing the orientations of commencements of each higher frequency cycle in said direction, said means for synchronizing the reference ring counter comprising:
   coarse synchronizing means including means responsive to said main reference group for resetting the reference counter means to a count representing said predetermined azimuth direction, and means for muting said resetting means during each count for an interval beginning just before said predetermined-azimuth count and ending just after it; and
   fine synchronizing means including oscillator means connected to advance the count of the reference ring counter means and having means to adjust its oscillation rate, means for obtaining sequential outputs from the reference counter means upon the occurrences of counts which should respectively correspond with the orientations in said direction of commencements of each higher frequency cycle, and means responsive to the moments of occurrence of these outputs relative to the moments of occurrence of said auxiliary reference group pulses and operative to actuate said rate-adjustment means to increase the oscillation rate when the reference pulses occur before said outputs and to decrease the oscillation rate when the reference pulses follow said outputs.

5. In a system as set forth in claim 1, said means for correcting the count in the storage counter means including coarse correcting means comprising, means for detecting a brief interval of the reference counter count extending from a time just before coincidence of the counters to a time just thereafter and for delivering a control voltage representative of that interval; drop-in means operative when actuated to change the count in the reference counter means; and coupling means for connecting said indicative signal representing the pointing of the pattern at the mobile unit to said drop-in means to actuate the latter; said control voltage being connected to maintain the coupling means inoperative during said interval.

6. In a system as set forth in claim 5, said coupling means including an error counter connected to accumulate a certain number of indicative signals occurring at times outside of said intervals before delivering an actuating signal to said drop-in means; and means sensitive to the occurrence of an indicative signal occurring during one of said intervals for resetting said error counter to zero.

7. In a system as set forth in claim 5, both counter means having similar counting stages, and said drop-in means including means for initially resetting the storage counter means and for initiating a brief delay; and means responsive to the termination of the delay to couple outputs from the stages of the reference counter means into the stages of the storage counter means to make the latter agree with the former.

8. In a system as set forth in claim 1, said means for correcting the count in the storage counter means including fine correcting means connected to receive an indicative signal and an output from said coincidence detecting means, and said fine correcting means being operative to add an increment to the count in said storage counter means whenever coincidence occurs before said indicative signal and to subtract an increment from the storage counter means whenever coincidence occurs after said indicative signal.

9. In a system as set forth in claim 8, read-out means connected to the storage counter means to display the bearing angle in integral degrees, and the storage counter means having stages for counting in fractions of a degree, and said increments introduced into said storage counter means each representing the smallest of said fractions, whereby a number of said increments are required to change the display by one degree.

10. In a system as set forth in claim 1, wherein said characteristic envelope pattern includes a superimposed modulation which goes through an integral number of cycles during each complete rotation of the beacon, and said indicative signals including a signal indicating the commencement of each such cycle as viewed from the mobile unit, the storage counter means and the reference counter means both including counting stages whose counts when synchronized should change simultaneously with the occurrence of an indicative signal; and said coincidence detecting means delivering a coincidence output and being further connected to deliver an anti-coincidence output when said stages are furthest out of coincidence; counter reverser means connected to selectively control the direction of counting by the storage counter means, the coincidence output being connected to actuate the reverser means to count the storage counter means up, and the anti-coincidence output being connected to actuate the reverser means to count the storage counter means down; and said indicative signals each being coupled to increment the storage counter means to count in the direction determined by the reverser means.

11. In a system as set forth in claim 1, decimal read-out means; logic means connected to said storage counter means and converting the digital count in its stages into decimal format and being connected to control said decimal read-out means.

References Cited

UNITED STATES PATENTS

| | | | |
|---|---|---|---|
| 3,349,401 | 10/1967 | Kennedy et al. | 343—106 |
| 3,375,522 | 3/1968 | Kennedy et al. | 343—106 |
| 3,386,096 | 5/1968 | Lundgreen et al. | 343—106 |

RODNEY D. BENNETT, JR., *Primary Examiner.*

H. C. WAMSLEY, *Assistant Examiner.*

U.S. Cl. X.R.

324—83